United States Patent [19]

Haygood

[11] 4,420,865
[45] Dec. 20, 1983

[54] METHOD FOR RETHREADING TUBULAR MEMBERS

[75] Inventor: Jerry Haygood, Houston, Tex.

[73] Assignee: Reed Tubular Products Co., Sugarland, Tex.

[21] Appl. No.: 318,909

[22] Filed: Nov. 6, 1981

[51] Int. Cl.³ .............................................. B23P 6/00
[52] U.S. Cl. ................................. 29/402.19; 29/406; 29/407; 10/1 B
[58] Field of Search ........................ 10/1 B, 87, 89 R; 29/402.01, 402.19, 406, 407; 51/277; 82/2.5, 28 B; 408/1, 3; 409/66, 67, 68

[56] References Cited

U.S. PATENT DOCUMENTS 2,567,480  9/1951  Heldenbrand ..................... 10/1 B Primary Examiner—Ervin M. Combs
Attorney, Agent, or Firm—Michael J. Caddell

[57] ABSTRACT

The present invention discloses methods and apparatus for rethreading damaged or incorrectly threaded tubular members such as tool joints, casing, and tubing for oil wells, which methods and apparatus are particularly advantageous for use with NC and CNC machines.

9 Claims, 15 Drawing Figures

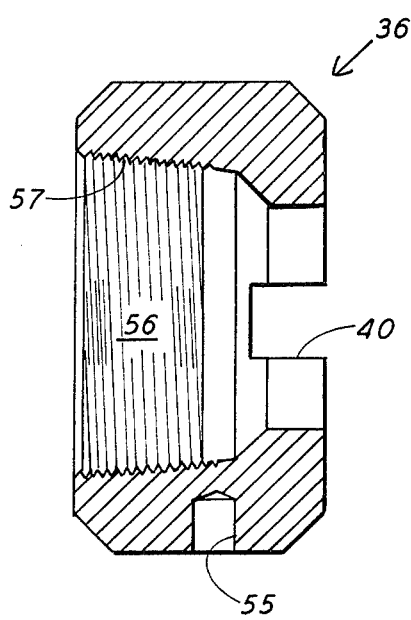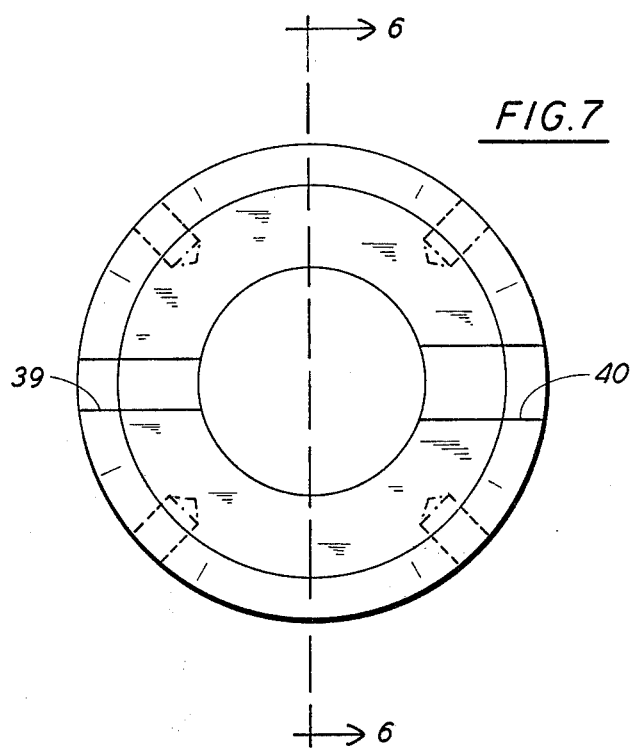

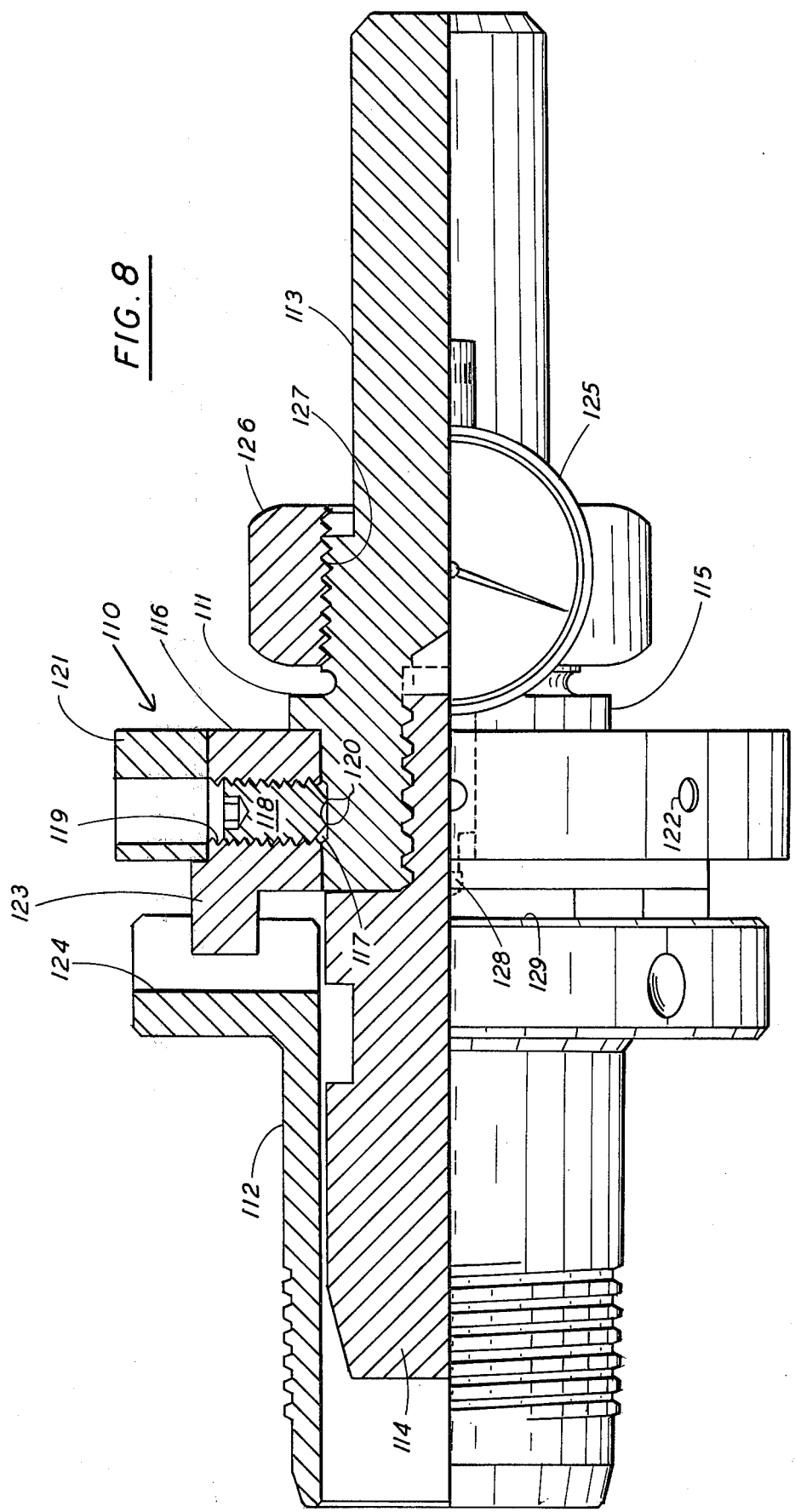

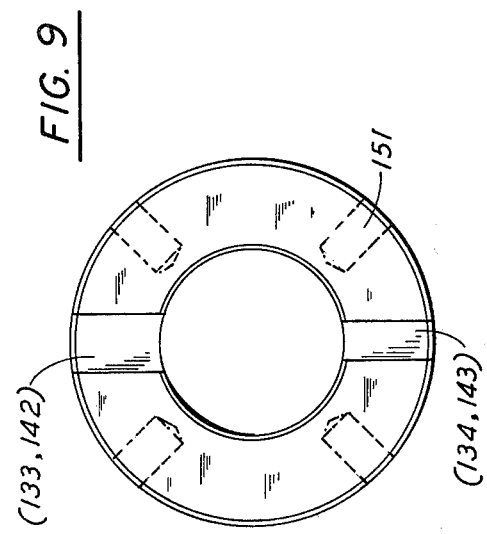
FIG. 9
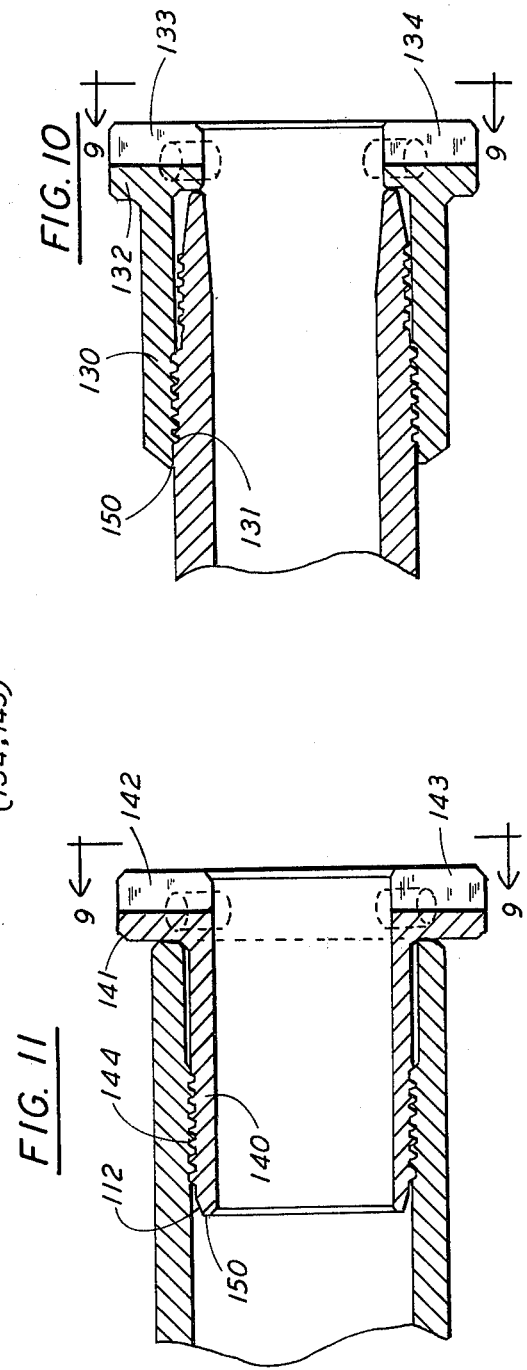
FIG. 10
FIG. 11

METHOD FOR RETHREADING TUBULAR MEMBERS

BACKGROUND OF THE INVENTION

The present invention involves methods and apparatus for rethreading tubular members which have been damaged or which were incorrectly threaded during the original machining operations. More particularly, the methods and apparatus are especially advantageous for use on numerically controlled (NC) machines and computer numerically controlled (CNC) machines for cutting threads on these members.

In the oilfield industry, there are various types of tubular members utilized in the drilling and production of underground hydrocarbon formations. Almost universally, these tubular members are made of a high-strength material, such as steel and the members are made in extended sections approximately 30 feet in length, joined together at each end by threaded connections.

Threaded tubular members for use in oil well drilling and production generally fall within a few narrowly defined classes. For example, tubular members for well drilling are called "drill pipe" and a number of sections of drill pipe connected together are collectively termed a "drill string". Usually, the threaded ends of drill pipe are called "tool joints" and these are manufactured separately from the pipe, then welded to the blank pipe to form drill pipe. Each section of drill pipe has an externally threaded (or male) end called a "pin", and an internally threaded (female) end called a "box". The most common type of thread design on tool joints is the tapered thread which allows for rapid connection and disconnection of the drill pipe sections, because it requires only a few turns to "make up" or "break out" a joint.

A second class of tubing used in the oil patch is the well casing which is larger diameter pipe with a thinner wall. Casing is used to line the well bore to prevent cave-in of the well bore, contamination of water strata, and loss of valuable hydrocarbon fluids through low pressure porous strata. Casing joints are usually termed "premium threaded" joints and may comprise tapered, cylindrical, or stepped cylindrical threads. Since casing is not removed or "tripped" from the well as often as drill pipe, it usually does not use the tapered connection, or it may have a very slight taper in the threads.

Tubing is the third category of oil well tubular pipe and is used to conduct hydrocarbons out of the wellbore or to insert mud, water, or treatment chemicals into the producing formation. Tubing is usually run inside of the casing of the wellbore, and may have tapered threads, cylindrical threads, or stepped threads.

All of these types of threads are well known in the industry. For example, the highly tapered drill pipe thread is disclosed in the patents to F. Stone, U.S. Pat. No. 1,932,427 (issued 10/31/33); S. Evans, U.S. Pat. No. 2,772,899 (issued 12/4/56); and E. Wehring et al, U.S. Pat. No. 3,047,316 (issued 7/31/62). Cylindrical threads are disclosed in the patents to C. L. Griffin, U.S. Pat. No. 2,636,753 (issued 4/28/53), and G. S. Knox, U.S. Pat. No. 2,907,589 (issued 10/6/59). Stepped cylindrical threads on oilfield tubulars are disclosed in the two patents to M. D. MacArthur, U.S. Pat. No. 2,992,019 (issued 7/11/61) and U.S. Pat. No. 3,100,656 (issued 8/13/63). The forming of the threaded portions of the tool joints and Premium Threaded Ends is very critical because of the strict requirements of high strength; and in some cases, high-pressure fluid tight sealing characteristics in the threaded joints.

In most modern threading operations, the cutting of the threaded sections on the tool joints and premium threaded ends is accomplished by computer controlled equipment, some of which are commonly called NC machines and CNC machines. These two types of automated machines utilize numerically actuated tape controls to provide automated machining functions on the tubular sections being threaded. The automated controls and automated machinery have been successful in speeding production of threaded members manyfold over the older conventional types of lathes and milling machines which were commonly used prior to the adoption of NC and CNC systems. One area in which the NC and CNC machining systems has not improved, is in the reworking of incorrectly threaded sections and damaged threaded sections of the tubular members. The methods currently in use for reworking of threaded sections are those that have been used for many years and are very slow and time-consuming. In fact, the conventional reworking techniques most often utilize more labor than can be recovered in the value of the part; and consequently, most threaded parts which are incorrectly threaded or which have damaged thread sections, are scrapped rather than reworked.

For example, a production machining operation using an NC machine, can produce up to 18 tool joints per hour in its threading operation. The NC machine is almost totally automatic and requires only the worker to set up the blank piece in the chuck or collet of the machine. Then the proper program is activated at the control panel and the indexing head of the machine performs all of the necessary threading and facing operations. The speed of the NC machine allows the high production rate of up to 18 threaded members per hour.

The conventional reworking technique utilizing the available technology is a three-step process. First, the damaged or improperly threaded piece is set up in a turret lathe to reface and rebore the seal face on the end of the joint. In the second step, the threads are milled on a thread mill to obtain a new thread profile. Then, in the third step, the face is "gaged" by removing a thin layer of material to obtain the exact "standoff" or spacing between the end of the joint and the threads themselves. These three reworking techniques generally require from 30 minutes to an hour on each piece, resulting in a production of reworked pieces of only one or two per hour. This is approximately 10 to 20 times slower than the normal NC production rate, and thus is economically unfeasible. Thus, the economics led to scrapping of the damaged or incorrectly threaded section, rather than attempting to rework the section and correct the defects or damaged portions.

Other methods of reworking damaged and defective threaded tubular goods utilizing NC and CNC machines are likewise as complicated and time-consuming as the older conventional machining techniques utilizing the turret lathe and the thread mill. The conventional techniques for reworking using the computer-assisted machines involves setting up a number of dial indicators and measuring instruments upon each piece to be reworked to ensure that the threaded member is located exactly in the correct position, both rotationally and axially with respect to the spindle and turret of the NC machine. It is critical that the piece to be reworked is clamped in the collet section of the lathe in the exact orientation with respect to the rotational axis as well as the longitudinal axis, which is necessary because the reworking is done by removing exactly one or more threads from the threaded section and cutting a new thread into the existing shoulder of the old thread. If alignment is not exact with respect to rotational and axial directions, it is possible that the new thread profile would extend into the already open area cut between the old existing threads. This would result in a second defective thread, having an improper thread profile.

Thus, the present invention provides an improvement over the conventional reworking techniques, which utilize the turret lathe and thread mill, as well as significant improvements over the conventional reworking techniques utilizing NC machines with complicated measuring instruments for locating the defective piece in the NC collet. The present invention achieves this economically and in a relatively short period of time by utilizing a special alignment technique, taking advantage of a master threaded piece and a threaded adapter having locator means formed in the adapter body.

BRIEF DESCRIPTION OF THE DRAWINGS

FIGS. 6 and 7 are detailed views of a pin adapter;

FIG. 8 is a partial cross-sectional view of a locator assembly for cylindrical and stepped threads;

FIGS. 9 through 11 illustrate typical views of box and pin adapters for cylindrical and stepped threads;

DESCRIPTION OF THE PREFERRED EMBODIMENTS

Figure 1:
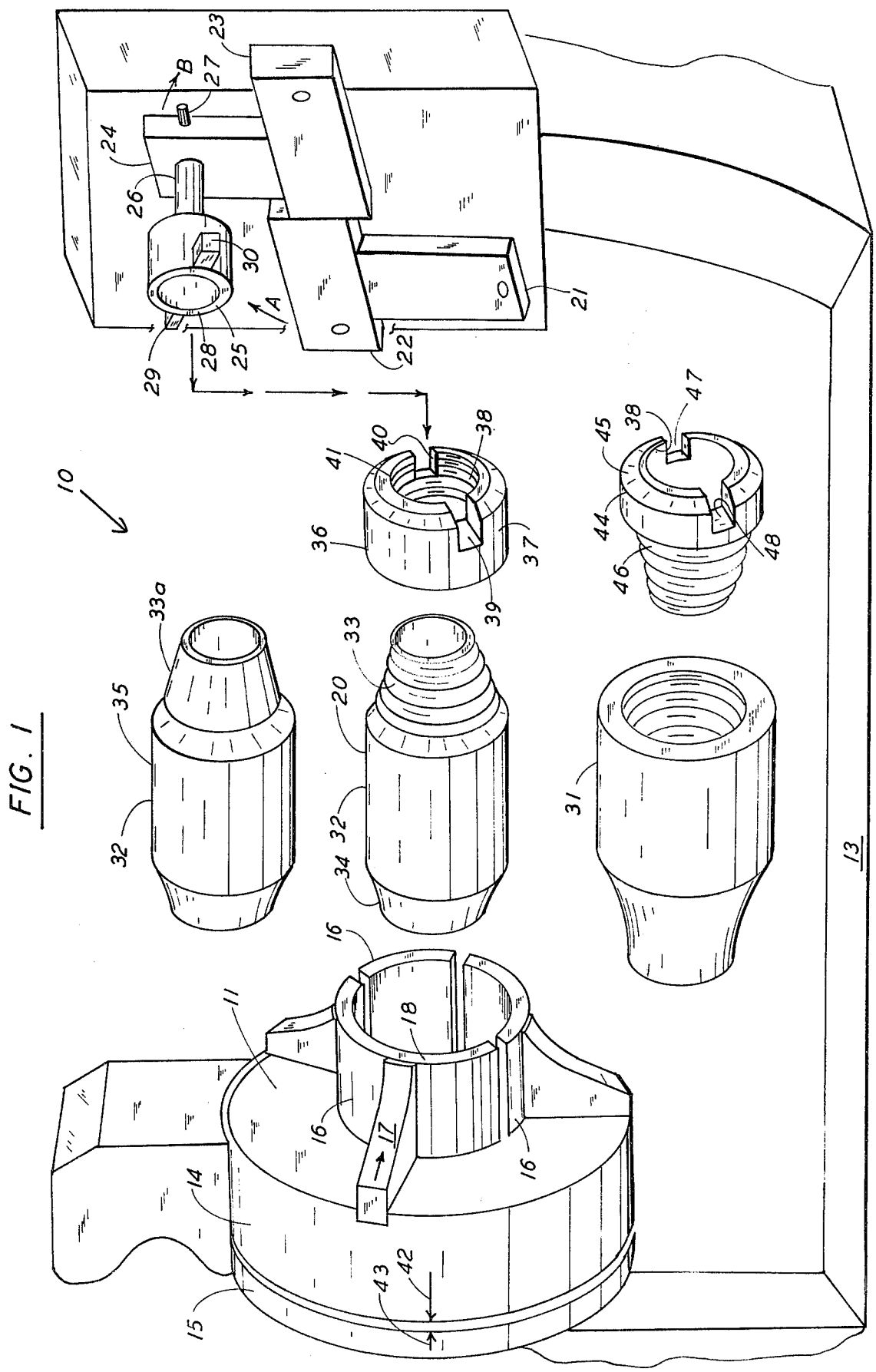
FIG. 1 is an exploded isometric view of the assembly of one embodiment of this invention.

Referring now to FIG. 1, a schematic illustration of a computer numerically-controlled (CNC) machine 10 is illustrated having a rotating spindle 11 and a multi-position turret 12. The CNC machine has a rigid base assembly 13 upon which the spindle assembly 11 and turret assembly 12 are rigidly mounted. The spindle 11 comprises a generally circular rotating head 14 rotatably mounted in a stationary mounting collar 15 and having radially slidable locking collets 16 mounted thereon. Collets 16 are slidably mounted in grooves formed in the front face of spindle 11 and are actuated by means such as pneumatic or hydraulic pressure. These collets move in a radial direction on head 14 and have generally cylindrical clamping plates 18 attached by means such as welding to support arms 17. The provision of pressure actuated clamping means 16 is to provide a highly accurate means to secure the work piece 20 in the spindle head 11. The tool turret 12 is a conventional NC or CNC machine tool turret having multiple radial work arms extending outward therefrom and being arranged for rotary or indexing movement as indicated by arrow "A" and arrow "B". Turret 12 has tool stations 21, 22, and 23 projecting radially outward therefrom, each of which contains a sharp metal-working instrument adapted to provide a specific metal-removing function on the rotating work piece 20. Turret 12 also comprises a fourth arm 24, which is designated as the alignment function for the NC device. Arm 24 has located thereon a locator assembly 25, comprising a mounting rod 26, slidably located in turret arm 24 and having a locking means such as a set screw for clamping rod 26 with respect to arm 24. A generally cylindrical alignment collar 28 is secured to the exposed end of rod 26 and carries a pair of lateral alignment arms 29 and 30, each of which is of a different thickness than the other.

A defective threaded tubular section 20 is illustrated in schematic in FIG. 1 in general axial alignment with spindle 11 and locator assembly 25. The particular work piece indicated in FIG. 1 is the pin end of a tool joint set which is a threaded upset section of tubular material, normally welded to a joint of drill pipe to provide a threaded connector for the drill pipe which in turn is then joined with other drill pipe sections to form a drill string. In the present example, the pin end of the tool joint set is illustrated for purposes of description, but the invention is not so limited. The invention can also be utilized for internal threaded sections such as the box end 31 of a tool joint set also illustrated in FIG. 1. The defective threaded end section 20 comprises a thick tubular body section 32, a tapered externally threaded pin section 33, and a tapered non-threaded welding section 34, adapted for welding to a section of drill pipe by means such as friction welding, or flash welding.

The defective pin section 20 is generally formed from a tool joint blank such as that disclosed at number 35 in the figure. These are generally forged from a piece of billet steel and provided with the thick body section 32 and the tapered pin end 33a, which later becomes threaded pin section 33. Also illustrated in FIG. 1, is a pin adapter 36, which generally comprises a circular cylindrical body portion 37, having an internally threaded tapered bore 38, adapted to threadedly engage tapered end 33 of the pin member 32. A pair of diametrically opposed alignment slots 39 and 40 are cut through the wall portion of adapter 36. One of the slots 40, is made wider in a circumferential direction than the opposite slot. The internal bore of collar 36 at the beveled end 41 is sized to snugly engage on the outside of locator collar 25. Likewise slot 40 is sized to snugly engage locator arm 29, and slot 39 is sized to snugly engage the different sized locator arm 30.

Thus, in typical operation, a tool joint forging blank 32 has been forged into the shape illustrated in FIG. 1 in the early stages of forming a finished tool joint for attachment to a section of drill pipe. This tool joint blank then progresses through the production process to a production threading machine similar to that disclosed in FIG. 1 at reference No. 10. This threading machine may be a CNC actuated machine with the same type spindle 11 and locking collets 16. It would also utilize a similar turret 12 with tool stations 21, 22, and 23. Normally, the machining of threads upon a tapered pin section 33a progresses without any problem and the finished tool joint will be acceptable and contain no defects.

Occasionally because of operator error, power failure, or some other interruption in the computer operation of the threading machine, a defective thread is cut on the blank 32 as shown at 33. This thread may be too shallow or may have some other defect in the profile. Normally the threads of each production piece are checked against a master gage to determine if the finished thread is acceptable. If the threaded tool joint is defective in the thread area, this piece is then passed to the rework assembly area and the defective thread is corrected. In conventional manufacturing processes, the rework of a defective thread requires more time than the inherent value of the finished product and this defective piece would be discarded or scrapped. By utilizing the present invention, the defectively threaded tool joint section may be reworked in a very short time and at a highly-efficient reworking rate. In this process, the defective joint is transported into the rework machine area to have the defective thread reworked and to salvage the defective joint.

At the beginning of the rework cycle, prior to beginning the reworking of the defective thread, the operator must set up the NC machine so that location of the threaded piece in the machine will be extremely accurate and require no difficult adjustments. This is done by taking a blank tool joint forging 32 and inserting it in the spindle while the locking sleeves 16 are in a relaxed position. The spindle head 11 has been rotated so that alignment mark 42 on the rotating head is aligned with mark 43 on stationary ring 15. When these are in direct alignment, the blank forging 32 is placed in the clamping portion of collets 16 and the clamping force is actuated as previously mentioned, thereby moving the collets 17 inward and clamping the blank forging in place. After the blank forging is placed in the spindle collet, the NC machine is started and a standard production program is used in the machine to form a standard production thread on the blank 35. After the multiple tool stations have performed their respective cutting and machining functions on the blank, thereby forming a finished threaded tool joint, the alignment marks on the spindle and the stationary ring are again brought into alignment and the tool station is indexed until the alignment assembly is coaxial with the finished tool joint. A threaded adapter 36 is then threaded onto the tool joint threaded end 33 until it is firmly seated thereon. The position of the rework adapter on the master part is determined by the makeup on the tapered thread section or by a shoulder of the master part engaging an internal shoulder in the adapter, depending upon the type of tool joint piece being reworked.

After the master pattern has been machined and the rework adapter has been threaded tightly thereon, the program in the NC or CNC control station is changed from the standard production program to the rework thread program. The values for the alignment radially and axially in the rework program are the same as those of the machine program coordinates used in producing the master joint. After the program is changed to rework, the set screw 27 is loosened and rod 26 is slid into the turret as far as it will go. Then the operator starts the machine tool rework cycle and the turret advances to a stop locator position which has been set in the NC program. At this time, the locator 25 will be spaced at a certain distance from the adapter 36. The operator then loosens the locator and slides it axially toward the adapter 36 and rotates it to engage sleeve 28 inside opening 38 with the proper alignment arms 29 and 30 in their proper slots 39 and 40. After the locator assembly 25 is snugly seated in the adapter, the set screw 27 is tightened, thereby locking the locator assembly with respect to turret 12. This establishes a control point because the turret has been moved to a point in the program of the computer and now at this point, coincides with the alignment of the master joint in the spindle 11 through the conjunction of locator 25 and adapter 36. At this time, all the necessary adjustment of the NC machine for reworking threads has been accomplished.

The program is then restarted and the turret moves backward to a preset point and stops. The operator then loosens collets 16 and removes the master part and takes the adapter 36 off the master part and takes the first defective threaded pin 32 and applies the threaded adapter 36 until it seats firmly on the pin end 33. The defective pin is then placed loosely in collets 16 and the program is started again, which moves the turret 12 toward the spindle 11, until it reaches the programmed stop; then the loosely fitted pin 32 is slid out of collet 16 the short distance required to engage adapter 36 on locator 25 with the proper slots 39 and 40 engaging the complementing engagement arms 29 and 30. At this time, alignment of the defective pin is identical to the previous alignment of the master part, and the operator then activates the tightening mechanism for collet 16, thereby clamping the defective piece in the identical position where the master piece was clamped.

At this time, the program can be started again, which slides the turret back on its track, allowing the operator to remove the threaded adapter 36. After 36 is removed, the reworking program is started and the turret rotates two arms into alignment with the defective pin 32. Continuing with the program, the spindle head 11 begins rotating, thereby rotating pin 32, and the first cutting tool on turret 12 is advanced into the defective pin and begins its cutting operation. After the first operation is completed, the NC machine backs the turret off and indexes the turret to bring another tool into alignment with the defective pin. The NC machine then continues with the rework program, going through the remaining machining operations with the other cutting tools on the turret. It should be noted here that the standard production program is very similar to the rework program, except that the rework program has the additional alignment steps involving the locator assembly 25 and the adapter collar 36. The rework program also is different from the standard production program in that the rework program is set up to cut one or more thread widths deeper into the part to give sufficient thickness of working material to cut the new threads. If the pitch of the thread on pin 33 is 4, (i.e. four threads per inch), then the rework program will advance the cutting instruments exactly one-fourth inch further into the piece to allow for removal of the defective thread and formation of a new, clean, precise thread.

After the NC machine has run through the rework program and formed the new thread on the defective pin, the turret will move backward and stop, allowing collets 16 to be released, whereupon the reworked tool joint is then ready for placement in the completed production line.

Also illustrated in FIG. 1 is the apparatus used to perform the same operation described above on a box end of a tool joint. The box end of a tool joint is the internally threaded end of the tool joint pair which is adapted to be threadedly engaged with the tapered pin 33 of the tool joint 20. The operation for the box end is same in every respect to that of the pin end, except that a different adjustment adapter 44 is utilized. This adapter has a cylindrical body section 45, a tapered externally threaded pin section 46 and an alignment bore 38, identical to that of adapter 36. Likewise, box adapter 44 has differing sizes of alignment slots 47 and 48 formed through the sidewalls thereof in the bore area 38. As it was in the pin adapter 36, slots 47 and 48 are sized for snug-fitting relation over locator arms 29 and 30.

It should be noted at this point that the process described above for reworking defective pin members, requires only an initial machining of a single master part for an unlimited number of reworked threaded pins. After the initial master part is produced on the reworked machine, there is no limit to the number of defective pins that can be reworked without the necessity for another master part to be machined. On the other hand, when the rework operator desires to switch from pin sections to box sections, a box master part must be machined in the same manner as the pin master part using the NC production program on this rework machine. After the master part box section is formed, the threaded adapter 44 is threadedly engaged in the master box until the threads are tightly engaged and no further engagement of adapter can be achieved. Then the locator assembly 25 is advanced, after loosening set screw 27, until it is snugly engaged in adapter 44, and set screw 27 is thereafter tightened to permanently establish the location of locator 25. Then the turret slide is reversed by the next step of the program and the master part and the box adapter are removed from the collets. The defective box section may then be placed in the collet loosely, and the box adapter 44 tightly engaged in the threaded end of the box. Then the turret is advanced until it reaches a preprogrammed point, at which it stops. The locator assembly 25 will be in very close proximity to the loosely-held box section 31.

The box section 31 is then moved outward from collets 16 a slight amount to engage slots 47 and 48 on locator arms 29 and 30 after which collets 16 are activated to tightly grip the box section. The turret 12 is then moved back to another programmed point and the box adapter 44 is removed from the threaded box. The remainder of the rework program is then activated on the NC machine, thereby rotating spindle 11 and moving turret 12 to engage the cutting tools one at a time in the defective box. The cutting operations are similar to the normal production operations, except for the advancement of at least one thread width into the stock as mentioned and described above with respect to the pin section. The remainder of the operation is very similar to that of the pin section and requires no further explanation.

Figure 2:
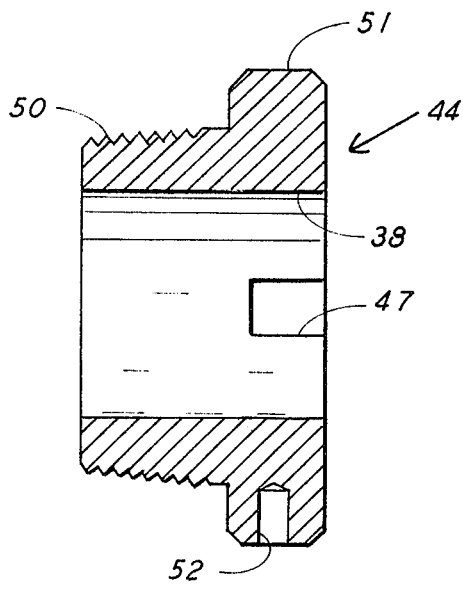
FIGS. 2 and 3 are detailed views of a box adapter.
Figure 3:
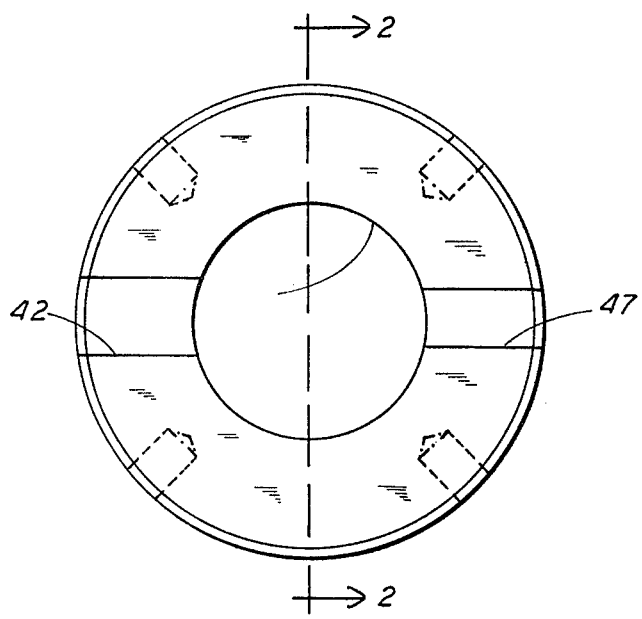

Referring now to FIGS. 2 and 3, these drawings illustrate in more detail the construction of the threaded box adapter 44 utilized with the tapered threaded box 31. The adapter 44 has a tapered pin section 50, sized to duplicate the tapered pin section of a standard production tool joint. Box adapter 44 also has an annular circular shoulder 51, having one or more pockets 52 formed therein in a radial orientation for receiving wrench means to tighten the adapter and loosen the adapter from the tool joint box section. In FIG. 3, the radial alignment slots 47 and 48 are shown in greater detail, and the difference in widths of the slots can be more easily determined from FIG. 3.

Figure 4:
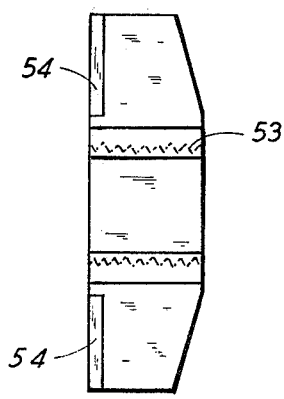
FIGS. 4 and 5 are detailed views of the locator arm frame.
Figure 5:
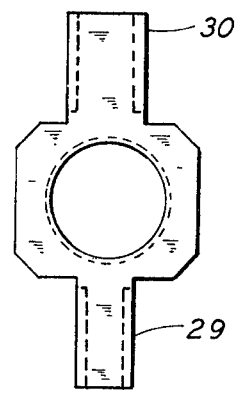
Figure 12:
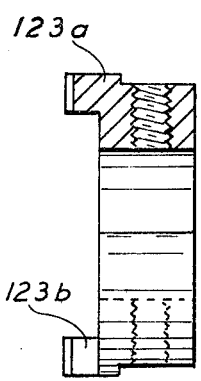
FIGS. 12 and 13 are detailed views of the locator collar for the assembly of FIG. 8.
Figure 13:
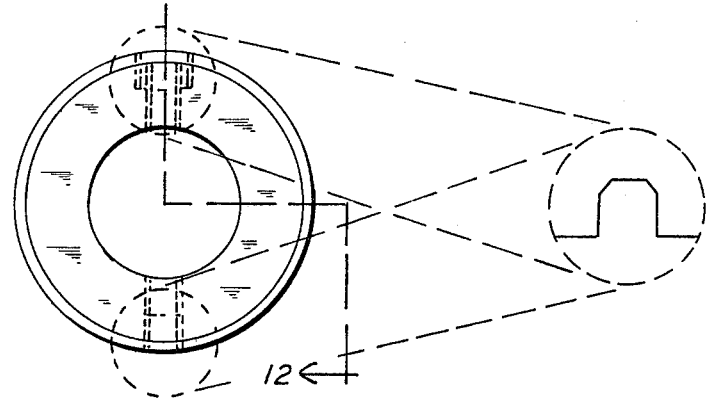
Figure 14:
FIGS. 14 and 15 are detailed views of the dial indicator collar of FIG. 8.
Figure 15:
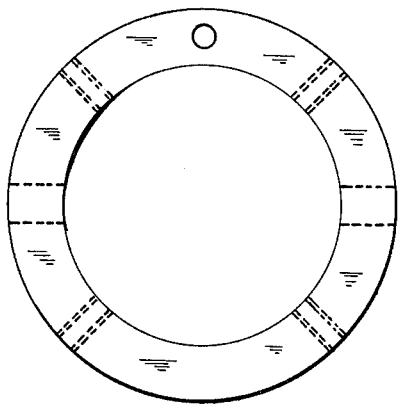

Referring now to FIGS. 4 and 5, the locator arm frame is illustrated in side cross-sectional view and in the front view. This more clearly illustrates the sizing of the locator arms 29 and 30 for engagement in slots 47 and 48 of box adapter 44 and pin adapter 36. The locator arm frame is attached to rod 26 by means of threads 53. The alignment arms 29 and 30 each have beveled shoulders 54 at their leading edge for ease in engagement with the alignment slots of the adapters.

FIGS. 6 and 7 illustrate a sectional side view and a front view of the pin adapter 36. This view illustrates the difference in width of alignment slots 39 and 40 to obtain proper alignment of locator assembly 25 therein. Adapter 36 also contains one or more wrench engagement recesses 55 for tightening and loosening of the adapter on the pin end of the defective threaded tubular member. The internal bore area 56 of adapter 36 comprises a tapered threaded section designed for close-fitting engagement with the tapered threaded end 33 of the tool joint. This section is a complimenting threaded portion 57 arranged for threaded engagement of the threads on pin end 33.

FIG. 8 illustrates an assembly for the reworking of defective threaded joints in tubing and casing. This assembly is particularly useful in the cylindrical and stepped threads previously described. In the figure, the alignment assembly 110 consists of the locator assembly 111 and adapter 112. The adapter shown in FIG. 8 is the male threaded adapter for use in the internally threaded female or box end of a cylindrical or stepped connection. The locator assembly 111 comprises a central locator rod 113 in which is the radial alignment rod 114. Rod 113 has an abutment shoulder 115 formed thereon and a locator collar 116 snugly attached around the outer periphery thereof. Rod 113 has an annular groove 117 below locator 116 in which a set screw 118 threadedly engaged in a threaded opening 119 seats to secure locator collar 116 on rod 113. Preferably set screw 118 has sharpened projections 120 for biting engagement into channel 117 to provide both axial and radial locking of locator collar 116 on rod 113.

A locator retention collar 121 is snugly located around the periphery of locator collar 116 and is retained thereon by set screws passing through openings 122. Locator collar 116 has differently-sized forwardly projecting tangs 123 arranged for close fitting engagement in matching slots formed in box adapter 112. A dial indicator 125 is located on rod 113 and securely held thereon by a jam nut 126, threadedly engaged on threaded shoulder 127 of rod 113. Dial indicator 125 has an indicator stem 128 passing through an opening formed in retention collar 121. Indicator stem 128 is arranged to abut the endmost face 129 of the adapter 112. The provision of the dial indicator 125 allows extremely precise location of the locator assembly with respect to the adapter 112.

FIGS. 9, 10, and 11 illustrate the two adapter members for use with the pin and box ends of the cylindrical and stepped threads. FIG. 10 illustrates the pin adapter having internal threads for engaging the externally threaded tubular section. The pin adapter 130 comprises a tubular body member having internally threaded end portion 131 and a flange portion 132. Flange portion 132 has a pair of alignment slots 133 and 134 of different widths for receiving alignment tangs 123 of the locator collar.

FIG. 11 illustrates the box adapter 112 shown in FIG. 8. Box adapter 112 comprises a cylindrical body section 140, having a radially-outwardly extending flange 141. Flange 141 has a pair of alignment slots 142 and 143 for receiving alignment tangs 123 of the locator assembly. Box adapter 112 has external threads 144 for threadedly engaging the internal threads of the box end of a threaded tubular section. Both the pin adapter 130 and the box adapter 112 have abutment shoulders 150 for alignment and abutment with existing shoulders on the threaded members with which they are engaged. FIG.

9 illustrates a typical end view of the flange portion of adapters 112 and 130, showing the slots 133, 142, 134, and 143. A set of radial recesses 151 are formed in the annular flange to provide wrench engagement means for tightening and loosening the adapters. FIGS. 12 through 15 illustrate more detailed views of the locator collar 116 and the retention collar 121 of FIG. 8.

The operation of the second embodiment illustrated in FIGS. 8 through 15 is very similar to that of the first embodiment. For example, if the operator wishes to rework the defective threads of a number of box end connections having stepped threads, he first places a blank box end in the collets of the NC machine as previously described with the first embodiment. The internal thread is then cut by the standard production program in the NC machine. After the standard internal thread has been formed by the machine, the box adapter 112 is threaded into the standard connection until it seats tightly therein, with shoulder 150 of adapter 112 abutting an internal land or shoulder in the standard connection. The locator assembly 111 is held in the turret of the NC machine in a relatively loose state, and the turret is advanced by activating the rework program until it is at a preprogrammed locator stop position in close proximity to the adapter 112 in the standard machined part. At this point, alignment rod 114 is moved into engagement with adapter 112, with tangs 123a and 123b of the locator collar engaging the respective sized slots 124 and 143 of adapter 112. When the tangs 123a and 123b are fully engaged in slots 124 and 143, the set screw in the locator is tightened, thereby locking the adapter assembly 111 in the turret of the NC machine. At this point, a reading is taken off of the dial indicator 125, indicating the amount of interference between indicator rod 128 and the front flange 129 of adapter 112.

The rework program is then moved to the next step which withdraws the turret from the work area, thereby withdrawing the locator assembly from the adapter 112. The production part or "master" is then separated from the collet and the box adapter 112 is removed from the master part. A defective part is then placed in the collet and the adapter 112 is snugly engaged with it. This is held loosely in the collet and the program is advanced to the next step so that the locator assembly 111 is moved forward in the NC machine. When the turret advances to the previously programmed stop point, it will stop, effectively in the identical point at which it stopped with respect to the standard production piece. The reworked piece containing adapter 112 is then advanced onto rod 114 with slots 124 and 142 engaging the locator rangs 123a and 123b of assembly 111. When the dial indicator reading is identical to that of the reading on the production part, the collets in the spindle are tightened on the rework piece and the rethreading threading may be accomplished accurately and efficiently. If desirable, a vernier adjustment of the work piece may be provided by means such as set screws or other means for adjusting the work piece to be rethreaded to obtain the exact reading of the dial indicator 125. It should be noted that this process is identical to that of the process in the first embodiment, except for the additional step of the dial indicator readings being taken to provide more precise axial alignment of the reworked threads. This is necessary in cylindrical and stepped threads because of the "standoff" dimension between the threads and the abutment surfaces 150, which provides internal sealing in the usual standard stepped threads and cylindrical threads type of connections.

Thus, the present invention discloses methods and apparatus for quickly and accurately reforming threads on defective and damaged threaded connections. These methods and apparatus are particularly advantageous for reworking threads on oil field pipe, such as drill pipe, casing and tubing, and more particularly on tapered, cylindrical, and stepped threads on these types of tubular members. In one manufacturing environment, applicant determined that the standard production rate for threading tapered pins was approximately 18 threaded pins per hour. The conventional reworking of defective or damaged threaded tapered pins could only proceed at a maximum rate of two per hour, and usually was less. Utilizing the methods and apparatus of the present invention, the reworking of tapered pins reached a rate of 11 per hour, thereby making the reworking of threaded joints economically advantageous and physically feasible.

The situation with the cylindrical threads and the stepped threads was even more critical since no practical process for reworking defective threads of this nature had been known in the industry. By utilizing the methods and apparatus of this invention, thread manufacturers can now rework defective and damaged cylindrical and stepped threads to the exact standards required in the standard production items.

It should be pointed out that although this invention has been described as a means for reworking damaged or defective threads, it is just as advantageous in reforming threaded connections which have perfectly good threads but have damaged or defective sealing surfaces. For example, a stepped, cylindrical-threaded tubular may have as many as three different annular sealing surfaces interspersed among the different threaded portions of the joint. These surfaces are critical in the operation of the subject tubular member in response to a strict fluid-tight requirement. They must abut mating surfaces in the other tubular member in which the threaded member is engaged and the resulting metal-to-metal seals must be fluid-tight. If any of these critical sealing surfaces are formed at the wrong axial standoff with respect to the threads, or, are formed at an incorrect angle with respect to the central axis of the tubular member, or have any kind of surface blemish or damage, the seal will not be acceptable and the tubular member would normally have to be scrapped. By utilizing the present invention, the rethreading operation can be advanced into the piece exactly one thread width past the existing threads, thereby allowing complete reforming of all the seal surfaces. Before the present invention, it was impractical and economically unfeasible to align the rework piece in the conventional machining equipment to reform the threads because of the small tolerances allowed in the standoff distance between the threads and the sealing shoulders. These tolerances usually range in the 0.001 inch category, or less. With the present invention, the rework piece can be quickly and accurately aligned in the NC machine or CNC machine for a complete rework of the threads and seal surfaces. This quick and accurate alignment does not require a complicated set of gaging measurements and set-up operations.

Another advantage of the present invention is the small amount of material that is removed when the defective part is reworked. It is preferable that the amount of material removed be absolutely the least necessary to clean up the threads and/or sealing surfaces.

For example, if the defective piece has a thread pitch of 4, which means that it has four threads to the inch in an axial direction, the rework program is set up to remove only some multiple, including one, of the thread width from the piece during rework of it. In this instance, the program could advance the machine tools either one-fourth inch, one-half inch, or three-fourths inch, and so on, deeper into the piece than the standard production program. This would ensure that the new thread would be cut into sufficient stock to provide a clean new surface, yet a minimum of material is necessarily removed by the process.

In conventional reworking processes, it is often necessary to cut the entire threaded portion from the defective piece and perform a new production threading procedure on the remaining pipe. The trouble with this process though, is that most threaded pipes have their threads formed in an "upset" or thicker portion of the pipe end. Utilizing the conventional reworking procedure on this pipe may result in cutting so much of the upset portion from the pipe that there is not enough left to properly form the threads. Even if there is enough upset left, the number of reworks is limited to one.

By using the present invention, the number of reworks possible can be extended tenfold or more over the conventional processes. This is particularly important in systems such as drill pipe where the pipe sections may be connected and disconnected twenty or thirty times or more in drilling just one well and the threads are subjected to a lot of abuse and damage during the "tripping" of the drill string in and out of the well bore to change drill bits. Likewise, tubing and casing may undergo a lot of heavy abuse in being shipped to the well site and lowered into the wellbore. Any serious damage in the threads and/or seal surfaces of this pipe makes it unusable in the well and may require scrapping of the entire thirty-foot section of pipe. Conventional means of reworking these damaged portions usually are not economically practical and the pipe is scrapped. The present invention not only provides a viable rework system for such pipe, but also allows reworking to be accomplished many times on each piece.

Although certain preferred embodiments of the present invention have been herein described in order to provide an understanding of the general principles of the invention, it will be appreciated that various changes and innovations can be effected in the described methods and apparatus for reworking threaded joints, without departing from these principles. For example, whereas the present invention is described in relation to tubular members for use in boreholes of oil wells, it is obvious that any type of threaded connection on tubular members, whether it be downhole or on the surface, indoors or outdoors, could be accomplished using the present invention. All modifications and changes of this type are deemed to be embraced by the spirit and scope of the invention.

The embodiments of the invention in which an exclusive property or privilege is claimed, are defined as follows:

1. A method of rethreading and resurfacing a threaded tubular member having damaged or defective threads or a damaged or defective sealing surface; said method comprising:

placing in the spindle of a numerically-controlled machining system, a blank tubular member to be threaded;

actuating a standard numerical production program of the machining system to form a standard acceptable thread and sealing surface for the blank member;

placing a preselected threaded adapter on the newly formed threads in tight engagement therewith, while said tubular member is still engaged in said machining system; said adapter having alignment means formed therein;

actuating a preprogrammed position in said machining system thereby advancing the turret toward said adapter to a preprogrammed stopping point;

releasing a sliding locator assembly from said turret and sliding it into aligning engagement with said alignment means in said adapter;

locking said locator assembly in said turret while it is engaged in said adapter;

actuating said program in said machine system to withdraw said turret and locator assembly from said adapter;

removing said adapter from said standard threaded blank;

removing said standard threaded blank from the collet of said spindle;

placing a tubular piece to be rethreaded loosely in said collet of said spindle;

threading said adapter onto the threads of said tubular piece in tight engagement;

aligning said spindle radially with a fixed position on said machine system;

actuating said program in said machine system to move said turret to said preprogrammed stopping point;

sliding and rotating said loosely held tubular piece and adapter until said adapter fittingly engages said locator assembly;

activating said machine system to lock said tubular piece in the collets of said spindle;

actuating said machine system to withdraw said turret to disengage said locator assembly from said adapter;

removing said adapter from said tubular piece; and, activating a rework program in said machine system to form a standard thread and seal surface on said tubular piece a predetermined distance into said piece further than said production program, wherein said predetermined distance is some multiple, including a single multiple, of the width of one standard thread.

2. A method of remachining a defective threaded tubular member, said method comprising:

(a) programming an automated machining system to form a desirable finished threaded tubular member from a blank member, including the step of including in said program a preprogrammed alignment stop for the moving turret of said system;

(b) providing an adjustable lockable locator assembly in said moving turret:

(c) producing a master workpiece from a blank by actuating said programmed machining system;

(d) placing an adapter having alignment means thereon, in tight abutting engagement with said master workpiece while it is in said system;

(e) actuating said system to move to said alignment stop position;

(f) adjusting said locator assembly to engage said alignment means in said adapter in close-fitting engagement therewith; and locking said locator assembly in said turret;

(g) removing said master workpiece and adapter from said system;

(h) placing said adapter snugly on a rework piece and placing said rework piece in said system such that said adapter thereon is in snug-fitting engagement with said alignment means in said preprogrammed alignment stop position;

(i) locking said rework piece in the spindle of said system while said adapter is engaged in said alignment means;

(j) removing said adapter;

(k) activating a rework program in said machining system adapted to machine a standard profile on said rework piece displaced a predetermined axial distance into said rework piece; wherein said predetermined distance is some multiple, including a single multiple, of the axial width of one finished thread of said piece; and, (l) removing said reworked piece from said machining system.

3. The method of claim 2 further comprising the steps of repeating steps (h) through (l) on at least one additional similarly-sized rework piece.

4. A method of rethreading and resurfacing a defective threaded tubular connector; said method comprising the steps of:

(a) programming a standard production threading program for forming a threaded tubular connector from a tubular blank, into an automated machining system having a rotatable spindle with locking collet means and a slidable tool turret with a slidably and rotatably adjustable locator assembly thereon;

(b) programming a locator stop position into said system for said slidable turret wherein said position is arranged to locate said locator assembly in close proximity to said spindle;

(c) locking a tubular blank in said collet means in said spindle and actuating said standard program to form a standard threaded member;

(d) actuating said program to move said turret to said locator stop position;

(e) adjusting said locator assembly to a predetermined orientation with respect to said standard threaded member;

(f) locking said locator assembly to said turret in said orientation and then removing said threaded member;

(g) placing a defective threaded connector loosely in said collet means;

(h) repeating said step (d) once;

(i) adjusting said defective connector to engage said locator assembly in aligning orientation therewith and then locking it in said collet means; and, (j) actuating a rework program in said machining system to reform said thread and the seal surface of said defective connector.

5. The rethreading method of claim 4 wherein said method further comprises the step of;

prior to said step (j), programming a rework program into said automated machining system substantially identical to said standard production program except that it advances the thread forming and seal-forming operations into said defective connector a distance equivalent to at least one multiple of the axial width of one thread of said threaded section.

6. The rethreading method of claim 4 wherein said method further comprises the step of:

prior to said step (j), programming a rework program into said automated system substantially identical to said standard production program.

7. A method of setting up an automated machining system for reworking a threaded section and sealing surface of a defective tubular connector, said system having a rotatable spindle and a slidable rotatable turret; said method comprising the steps of:

(a) locating on said turret an adjustable alignment assembly having radial and axial adjustment capabilities;

(b) programming said system to produce a standard production thread on a blank tubular member; and further having a predetermined locator stop programmed therein for said sliding turret, arranged to place said alignment assembly in close proximity to said spindle;

(c) placing a blank tubular member in a locking collet on said spindle and locking it therein;

(d) actuating said program to form a standard thread on said blank tubular member;

(e) actuating said program to move said turret to said locator stop;

(f) adjusting said alignment assembly to align with said threaded member and locking said assembly against further adjustment on said turret; and, (g) removing said threaded member from said machining system.

8. The setting-up method of claim 7 including the step of programming a rework program into said machining system, said rework program being substantially identical to said standard production program except for said rework program being adapted to advance the reworking thread an incremental distance into said defective connector farther than said standard production program.

9. The setting-up method of claim 8 wherein said incremental distance is an exact multiple, including the single multiple, of the axial width of one thread of said standard production thread.

* * * * *